US012764804B2

(12) United States Patent
Peranandam et al.

(10) Patent No.: US 12,764,804 B2
(45) Date of Patent: Oct. 13, 2026

(54) METHOD AND SYSTEM FOR PATTERN-BASED INTELLIGENT RANGING AND CONNECTIVITY FEEDBACK TO WIRELESS SYSTEMS

(71) Applicant: GM Global Technology Operations LLC, Detroit, MI (US)

(72) Inventors: Prakash M. Peranandam, Rochester Hills, MI (US); Venkata Naga Siva Vikas Vemuri, Farmington Hills, MI (US); Jinzhu Chen, Troy, MI (US); John Sergakis, Bloomfield Hills, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 428 days.

(21) Appl. No.: 18/416,177

(22) Filed: Jan. 18, 2024

(65) Prior Publication Data

US 2025/0240833 A1 Jul. 24, 2025

(51) Int. Cl.

*H04W 76/10* (2018.01)
*H04B 7/06* (2006.01)
*H04B 17/318* (2015.01)

(52) U.S. Cl.

CPC .......... *H04W 76/10* (2018.02); *H04B 7/0626* (2013.01); *H04B 7/0632* (2013.01); *H04B 17/328* (2023.05)

(58) Field of Classification Search

None

See application file for complete search history.

(56) References Cited

U.S. PATENT DOCUMENTS

| | | | | |
|---|---|---|---|---|
| 9,860,710 | B2 * | 1/2018 | Buttolo | H04W 4/021 |
| 2015/0149042 | A1 * | 5/2015 | Cooper | B60R 25/245 701/48 |
| 2017/0048680 | A1 * | 2/2017 | Chuang | H04W 4/80 |
| 2017/0120867 | A1 * | 5/2017 | Beauvais | B60R 25/24 |
| 2020/0210885 | A1 * | 7/2020 | Arora | G06F 9/5055 |
| 2020/0262392 | A1 * | 8/2020 | Oman | B60R 25/245 |
| 2020/0408869 | A1 * | 12/2020 | Oman | B60R 25/209 |
| 2023/0296388 | A1 * | 9/2023 | Gage | G01C 21/3415 701/533 |
| 2023/0379676 | A1 * | 11/2023 | Zhong | H04W 4/023 |
| 2025/0214532 | A1 * | 7/2025 | Zhao | G07C 9/00571 |
| 2026/0126546 | A1 * | 5/2026 | Kim | B60R 25/245 |

FOREIGN PATENT DOCUMENTS

DE 102016120414 A1 5/2017

* cited by examiner

*Primary Examiner* — Clemence S Han

(74) *Attorney, Agent, or Firm* — Vivacqua Crane, PLLC

(57) ABSTRACT

A method for operating a digital key configured to wirelessly connect to a vehicle includes receiving wireless communication signal data and vehicle data. The method further includes ranking, using a machine learning model, a plurality of wireless communication technologies for wirelessly connecting a mobile device to the vehicle and selecting one of the plurality of wireless communication technologies based on ranking of the plurality of wireless communication technologies. Further, the method includes establishing a wireless communication between the mobile device and the vehicle using the selected wireless communication technology. A digital key application is running on a mobile device, thereby allowing the digital key application to operate as a digital key for the vehicle after the wireless communication between the mobile device and the vehicle has been established.

18 Claims, 3 Drawing Sheets

METHOD AND SYSTEM FOR PATTERN-BASED INTELLIGENT RANGING AND CONNECTIVITY FEEDBACK TO WIRELESS SYSTEMS

INTRODUCTION

The present disclosure relates to systems and methods for establishing wireless communication between a wireless devices, such as a smartphone, and a vehicle system. More particularly, the present disclosure relates to methods and systems for pattern-based intelligent ranging and connectivity of wireless systems and feedback to wireless devices.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Sometimes, it is useful to wirelessly connect a mobile device, such as a smartphone or a table, to a vehicle. For instance, a mobile device may operate a digital key that allows a vehicle operator to lock and unlock their vehicles. In such cases, it is desirable to establish a strong wireless connection between the vehicle and the mobile device.

SUMMARY

The present disclosure describes a method for operating a digital key configured to wirelessly connect to a vehicle. The method includes receiving wireless communication signal data. The wireless communication signal data includes information about a plurality of wireless communication signals within a predetermined distance from the vehicle forming a network pattern. The wireless communication signal data includes a received signal strength indicator (RSSI) of each of the plurality of wireless communication signals within the predetermined distance from the vehicle. The method also includes receiving vehicle data. The vehicle data includes information about the vehicle and the parking location of the vehicle. The method also includes triggering a digital key system of a vehicle to establish wireless connection with a digital key of a mobile device in response to matching the network pattern and determining that a distance between the mobile device between is less than a predetermined distance threshold. The method also includes ranking, using a machine learning model (e.g., deep neural network), a plurality of wireless communication technologies (i.e., wireless communication networks) for wirelessly connecting a mobile device to the vehicle. The vehicle data and the wireless communication signal data are inputs of the machine learning model. The method also includes selecting one of the plurality of wireless communication technologies (i.e., wireless communication networks) based on ranking of the plurality of wireless communication technologies as determined by the machine learning model. The method also includes establishing a wireless communication between the mobile device and the vehicle using the selected one of the plurality of wireless communication technologies (i.e., wireless communication networks). The wireless communication technologies may be referred to as wireless communication networks (e.g., cellular network, Wi-Fi network, Bluetooth network, UWB network, etc.). A digital key application is running on the mobile device, thereby allowing the digital key application to operate as a mobile digital key for the vehicle after the wireless communication between the mobile device and the vehicle is established. The method described in this paragraph improves vehicle technology by establishing a strong wireless connection between a mobile device and a vehicle, thereby minimizing the times that the operation of the digital key fails.

Implementations may include one or more of the following features. The method may include receiving navigational data. The navigational data includes the location of the vehicle while the vehicle is moving toward the parking location. The method further includes determining a distance from a location of the vehicle to the parking location using the navigational data, comparing the distance from the location of the vehicle to the parking location with a predetermined distance threshold to determine whether the distance from the location of the vehicle to the parking location is less than the predetermined distance threshold, and collecting the wireless communication signal data in response to determining that the distance from the location of the vehicle to the parking location is less than the predetermined distance threshold. The wireless communication signal data includes the RSSI of each of the plurality of wireless communication signals at multiple locations while the vehicle is moving toward the parking location, and the multiple locations are spaced apart from one another by a predetermined distance building the network map or pattern. The method further includes collecting parking infrastructure data solely in response to determining that the distance from the location of the vehicle to the parking location is less than the predetermined distance threshold. The parking infrastructure data is information about a parking infrastructure in the parking location. Also, the method may include uploading the wireless communication signal data and the surrounding network pattern to the digital key application running on the mobile device and uploading the wireless communication signal data to a remote server. The wireless communication signal data includes the RSSI of each of the plurality of wireless communication signals at multiple locations while the vehicle operator is moving away from the vehicle after the vehicle has been parked at the parking location. The multiple locations are spaced apart from one another by a predetermined distance. The method further includes uploading the wireless communication signal data and the network pattern to the vehicle and uploading the wireless communication signal data to a remote server. The wireless communication signal data includes the RSSI of each of the plurality of wireless communication signals at multiple locations while the vehicle operator is moving away from the vehicle after the vehicle has been parked at the parking location. The multiple locations are spaced apart from one another by a predetermined distance. The method may include analysis of the observed and current network pattern, determining that a vehicle operator is constantly moving toward the vehicle, determining a distance from the vehicle operator to the vehicle while the vehicle operator is constantly moving toward the vehicle to determine whether the distance from the vehicle operator to the vehicle is less than a predetermined approaching threshold, and in response to determining that the distance from the vehicle operator to the vehicle while the vehicle operator is constantly moving toward the vehicle is less than the predetermined approaching threshold. The method may include triggering the vehicle wireless system to establish the wireless connection, and the trigger can be P2P communication or through remote server and, in response, ranking of available communication technologies are made using the machine learning (ML) model, the plurality of wireless communication technologies for wirelessly connecting a mobile device to the vehicle. The user profile pattern should be part of ML training and it serves as one of the inputs of the machine learning model. The plurality of wireless communication technologies includes near-field communication (NFC), ultra-wideband (UWB), Bluetooth, Wi-Fi, and a cellular network. The method may include various digital key functionalities such as operating the digital key to conduct vehicle operations (e.g., lock or unlock a door, open a truck, enable ambient light, customize infotainment system, etc.) after establishing the wireless communication between the mobile device and the vehicle using the selected one of the plurality of wireless communication technologies. The method may include selecting the wireless communication technology with the highest rank.

The present disclosure further describes a vehicle. The vehicle includes a body, a plurality of vehicle transceivers coupled to the body, a plurality of sensors coupled to the body, and a vehicle controller in communication with the vehicle transceivers and the sensors. The vehicle controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
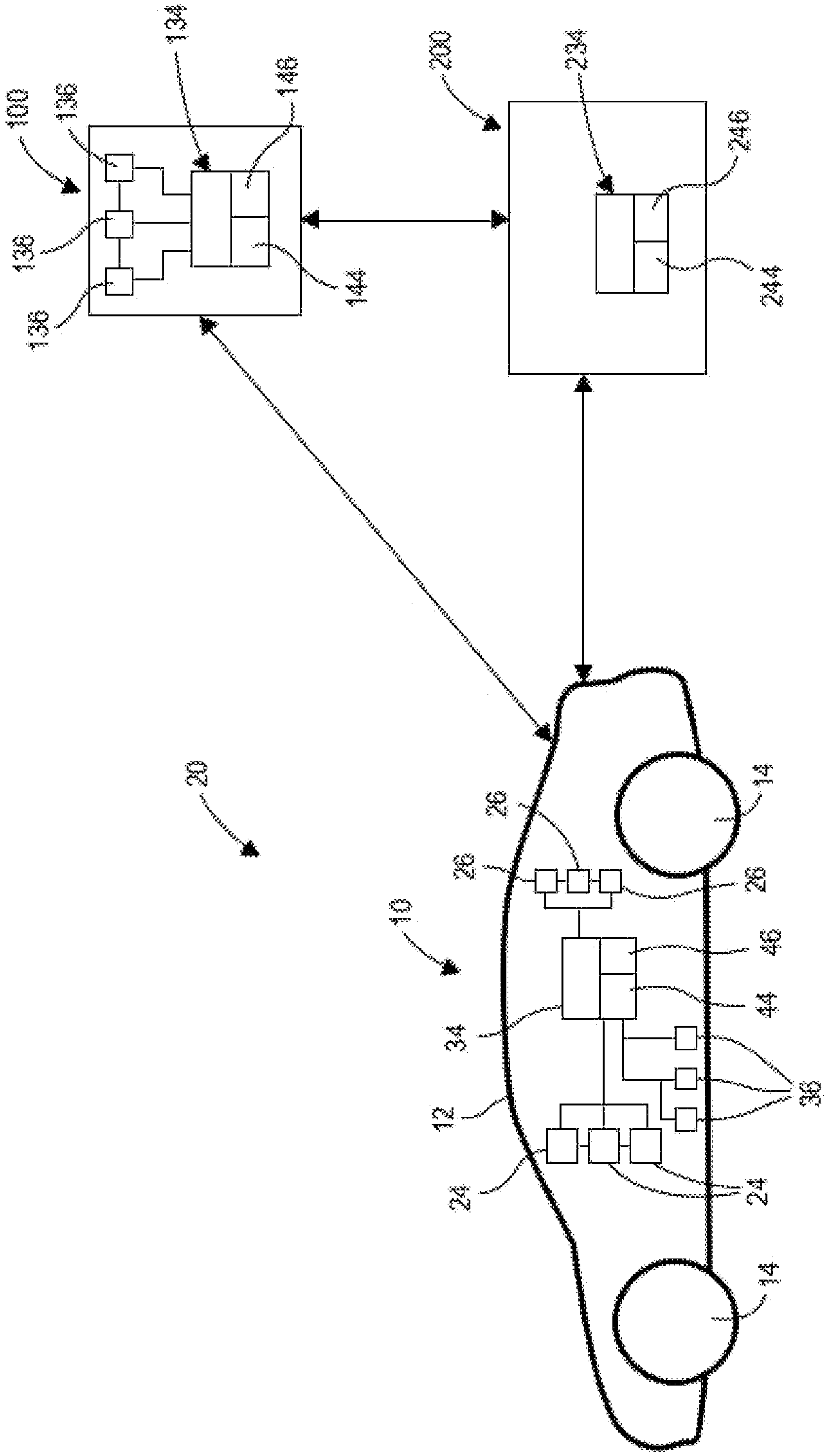
FIG. 1 is a schematic diagram of a system for operating a digital key configured to wirelessly connect to a vehicle.

Reference will now be made in detail to several examples of the disclosure that are illustrated in accompanying drawings. Whenever possible, the same or similar reference numerals are used in the drawings and the description to refer to the same or like parts or steps.

FIG. 1 shows a system 20 for operating a digital key configured to wirelessly connect to a vehicle 10. The system 20 may be referred to as the digital key system. The vehicle 10 generally includes a body 12 and a plurality of wheels 14 coupled to the body 12. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), boats, airplanes, recreational vehicles (RVs), drone, e-bike, and as well as any security systems such as, home security system, computer security system, locker system, etc., may also be used.

The vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more proximity sensors, one or more ultrasonic sensors, one or more thermal imaging sensors, Global Positioning System (GPS) transceivers, and/or other sensors. Each sensor 24 is configured to generate a signal that is indicative of the sensed observable conditions (i.e., sensor data) of the exterior environment and/or the interior environment of the vehicle 10. The signal is indicative of the sensor data collected by the sensors 24.

The vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 is specifically programmed to execute the method 300 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10.

The vehicle 10 further includes one or more actuators 26 in communication with the vehicle controller 34. The actuators 26 control one or more vehicle features such as, but not limited to, the propulsion system, the transmission system, the steering system, radio, air-conditioning system, and the brake system of the vehicle 10. In various embodiments, the vehicle features may further include interior and/or exterior vehicle features such as, but are not limited to, doors, a trunk, and cabin features such as air, music, lighting, etc.

The host vehicle 10 further includes one or more vehicle transceivers 36 in communication with the vehicle controller 34. Each of the vehicle transceivers 36 is configured to wirelessly communicate information to and from other entities using, for example, one or more wireless communication technologies. As non-limiting examples, the wireless communication technologies include near-field communication (NFC), Ultra-wideband (UWB), BLUETOOTH, and Wi-Fi, and a cellular network. As non-limiting examples, the vehicle transceivers 36 may transmit and/or receive information from other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the vehicle transceivers 36 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The system 20 includes a mobile device 100 in communication with the vehicle 10. In the present disclosure, the term "mobile device" is a piece of portable electronic equipment that can communicate with another device at least through wireless signals. As non-limiting examples, the mobile device 100 may be a smartphone or a smart tablet, or a smart watch or an embedded chip that can communicate with the vehicle 10. The mobile device 100 is running a digital key application and includes one or more device transceivers 136 in communication with the vehicle controller 34. Each device transceiver 36 is configured to wirelessly communicate information to and from other entities using, for example, one or more wireless communication technologies. As non-limiting examples, the wireless communication technologies include near-field communication (NFC), Ultra-wideband (UWB), BLUETOOTH, and Wi-Fi, and a cellular network. The mobile device 100 includes device controller 134. The device controller 134 includes at least one device processor 144 and a device non-transitory computer readable storage device or media 146. The device processor 144 may be a custom made or commercially available processor, a central processing unit (CPU), a graphics processing unit (GPU), an auxiliary processor among several processors associated with the device controller 134, a semiconductor-based microprocessor (in the form of a microchip or chip set), a macroprocessor, a combination thereof, or generally a device for executing instructions. The device readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the device processor 144 is powered down. The device computer-readable storage device or media 146 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the device controller 134 in controlling the vehicle 10. For example, a digital key application runs on the mobile device 100. The digital key application operates a digital key that allows the vehicle operator to actuate one or more actuators 26 (e.g., vehicle door) of the vehicle 10 remotely from the mobile device 100. For instance, the vehicle operator may use the mobile device 100 to lock or unlock a door through the digital key application. In another example, the vehicle operator may start an internal combustion engine of the vehicle 10 through the mobile device 100 by using the digital key application.

The system 20 further includes a remote server 200 in communication with the vehicle 10 and the mobile device 100. As non-limiting examples, the remote server 200 may be a cloud-based system or an edge-based system. The remote server 200 includes a server controller 234. The server controller 234 includes at least one server processor 244 and a server non-transitory computer readable storage device or media 246. The server processor 244 may be a custom made or commercially available processor, a central processing unit (CPU), a graphics processing unit (GPU), an auxiliary processor among several processors associated with the server controller 234, a semiconductor-based microprocessor (in the form of a microchip or chip set), a macroprocessor, a combination thereof, or generally a device for executing instructions. The server readable storage device or media 246 may include volatile and nonvolatile storage in read-only memory (ROM), random-access memory (RAM), and keep-alive memory (KAM), for example. KAM is a persistent or non-volatile memory that may be used to store various operating variables while the server processor 244 is powered down. The server computer-readable storage device or media 246 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 234 in controlling the vehicle 10.

Figure 2:
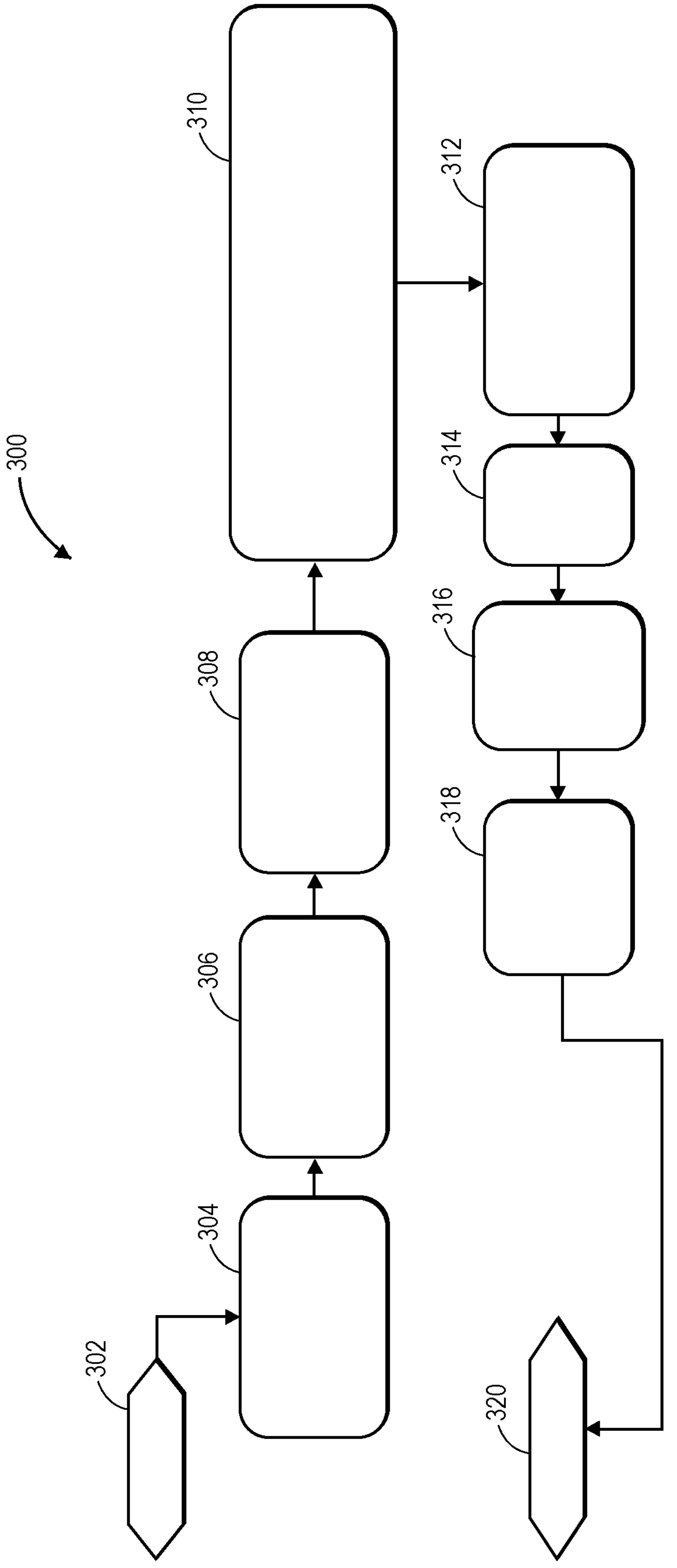
FIG. 2 is a flowchart of a method for operating a digital key configured to wirelessly connect to a vehicle.

FIG. 2 is a flowchart of a method 300 for operating a digital key configured to wirelessly connect to the vehicle 10. The method 300 begins at block 302. At block 302, a triggering event occurs to start the method 300. The triggering event may occur in different ways. The vehicle controller 34 may determine that a triggering event occurred based on vehicle data (e.g., navigational data) received. The vehicle data may include navigational data, which in turn includes the current location of the vehicle 10 while the vehicle 10 is moving toward a parking location, map data, GPS data, navigational destination, among others. To do so, the vehicle controller 34 determines the distance from the current location of the vehicle 10 to the parking location, such as a frequent parking location or a navigation destination, using the navigational data or vehicle data. The vehicle controller 34 then compares the distance from the current location of the vehicle 10 to the parking location with a predetermined distance threshold (e.g., two hundred meters or three hundred fifty meters) to determine whether the distance from the current location of the vehicle 10 to the parking location is less than the predetermined distance threshold. If the distance from the current location of the vehicle 10 to the parking location is less than the predetermined distance threshold, the vehicle controller 34 determines that a triggering event has occurred. The vehicle operator may also initiate a triggering event through a manual request (e.g., pushing a button). In response to determining that a triggering event has occurred, the method 300 continues to block 304.

At block 304, the vehicle 10 uses the sensors 24 to collect the wireless communication signal data within a predetermined distance of the vehicle 10. The wireless communication signal data includes the signal strength (e.g., received signal strength indicator (RSSI)) and channel conditions information (such as Channel State Information (CSI) and Channel Quality Information (CQI)) of each of the plurality of wireless communication signals (e.g., NFC, Wi-Fi, BLUETOOTH, and/or cellular signals) at multiple locations while the vehicle 10 is moving toward a parking spot. These multiple locations are spaced apart from one another by a predetermined distance (e.g., ten meters) and each location wireless communication signal data is captured on a moving window of a defined size (e.g., ten windows). Once the vehicle is parked the moving window information is obtained as part of the network pattern map. Further, at block 304, the vehicle 10 uses the sensors 24 to collect parking infrastructure data that becomes part of the pattern map information solely in response to a triggering event as discussed above. The parking infrastructure data is information about a parking infrastructure in the parking location. For instance, the parking infrastructure includes data whether the parking area is a rooftop parking, a multi-level parking garage, an underground parking, a roadside parking, a public parking lot, a valet parking, etc. Then, the method 300 continues to block 306.

At block 306, the vehicle controller 34 detects the parking location using the sensors 24 (e.g., camera), the automatic parking assist (APA), the steering of the vehicle 10, transmission mode, GPS, etc. To do so, the vehicle controller 34 may detect the activation and completion of the APA, detect the parking markings, the speed, steering and movement of the vehicle 10, detecting a transmission mode change and/or a manual request. Once the parking location is detected and confirmed, the vehicle controller 34 may analyze, saves, and filters the wireless communication signal data to only the data that is relevant to the closest slots (e.g., five locations) of the moving window closest to the parking location. Then, the method 300 continues to block 308.

At block 308, the vehicle controller 34 assesses, qualifies, sorts, sequence, and uploads the filtered wireless communication signal data to the digital key application running on the mobile device 100 and/or the remote server 200. Next, the method 300 continues to block 310. Specifically, at block 308, the vehicle controller 34 assesses wireless communication signal data of signals in multiple wireless communication technology formats (e.g., Bluetooth Low Energy, Wi-Fi, UWB, NFC, cellular). For each wireless communication technology, the vehicle controller 34 rates the wireless communication technologies (i.e., networks) with an individual technology rating score. The score may have a yellow metrics rating, a green metrics rating, and a red metrics rating. Each wireless communication technology may be rated based on metrics specific to that technology. For instance, UWB signals may be rated (green, red, or yellow) based on the angle of arrival accuracy, signal strength the distance accuracy, the communication range, whether the ranging is secure, and energy consumption. The NFC signals may be rated based on the uptime, the signal strength, the Rayleigh distance, the spatial effects, the grid alignment and size, and the near-field beam split. The Wi-Fi signals may be rated based on the uptime, signal strength, packet loss and retransmissions, latency, bandwidth and throughput, and jitter. The vehicle controller 34 then considers environmental, vehicle, and user factor to determine a dynamic and historic pattern. These dynamic and historic pattern is then provided as feedback to the remote server 200 and the digital key application running on the mobile device 100. The execution of block 308 may include the method 400 shown in FIG. 3.

Figure 3:
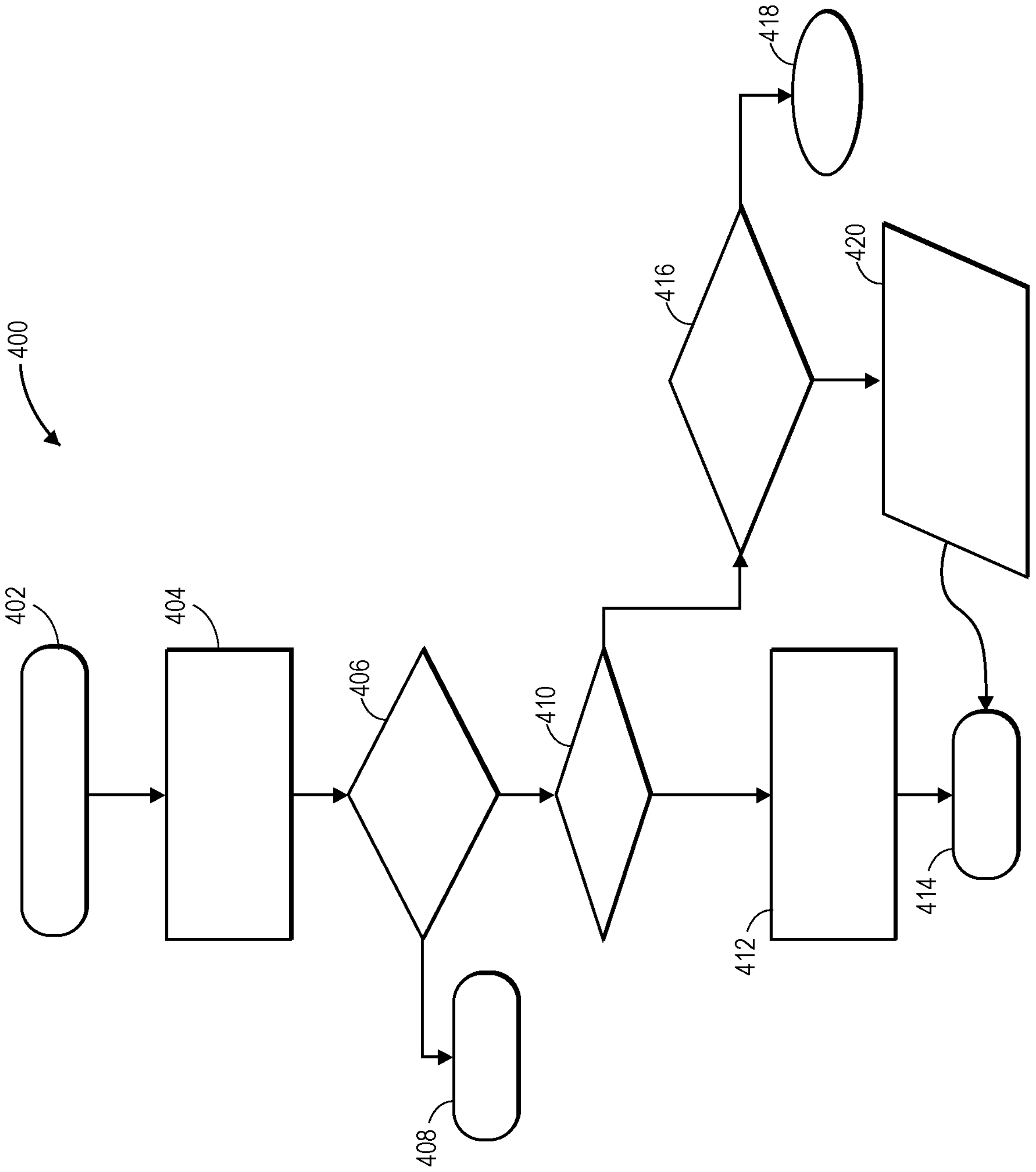
FIG. 3 is a flowchart of a method for ranking wireless communication technologies.

FIG. 3 is a flowchart of a method 400 for ranking wireless communication technologies. The method 400 begins at block 402 and then proceeds to block 404. At block 404, while the vehicle 10 approaches the parking location, the vehicle controller 34 monitors the state of health (SOH) of the signals of each available wireless communication technology (e.g., Bluetooth, Wi-Fi, NFC, UWB) used for establishing communication between the mobile device 100 and the vehicle 10. Then, the method 400 proceeds to block 406 and is therefore used to operate the digital key.

At block 406, the vehicle controller 34 determines if there have been any changes in the SOH status of the signals of each available wireless communication technology as the vehicle 10 moves toward the parking location. If there haven't been changes in the SOH status of the signals of each available wireless communication technology, the method 400 continues to block 408. At block 408, no action is taken. If there have been any changes in the SOH status of the signals of each available wireless communication technology as the vehicle 10 moves toward the parking location, the method 400 proceeds to block 410. At block 410, the vehicle controller 34 determines whether any wireless communication signal of a wireless communication technology has been rated as red as explained above. The red rating indicates that the signal is not usable for operating the digital key. If any wireless communication signal of a wireless communication technology has been rated as red, then the method 400 proceeds to block 412.

At block 412, the vehicle controller 34 eliminates the wireless communication signal of the wireless communication technology that was rated as red from a priority ranking matrix. Then, the method 400 continues to block 414. At block 414, the method 400 ends.

If, at block 410, the vehicle controller 34 determines that no wireless communication signal of a wireless communication technology has been rated as red, the method 400 proceeds to block 416. At block 416, the vehicle controller 34 determines whether the change in SOH status of wireless communications signals is equal to or greater than predetermined threshold. If the change in SOH status of wireless communications signals is not equal to or greater than predetermined threshold, then method 400 proceeds to block 418. At block 418, no action is taken.

If the change in SOH status of wireless communications signals is equal to or greater than predetermined threshold, then method 400 proceeds to block 420. At block 420, the wireless communication technology which had a change in SOH is reassessed. That is, this wireless communication technology is re-prioritized in a priority ranking matrix and rescored. The new priority ranking matrix is uploaded to the digital key application running on the mobile device 100 and the remote server 200. Then, the method 400 continues to block 414.

Returning to FIG. 2, at block 310, the device controller 134 determines that the vehicle operator, who is holding the mobile device 100, is moving away from the vehicle 10. By detecting that the mobile device 100 is moving away from the parking location, the device controller 134 can determine that the vehicle operator is moving away from the vehicle 10. At this juncture, the digital key application running on the mobile device 100 collects wireless communication signal data at multiple locations while the vehicle operator is moving away from the vehicle 10. As discussed above, the wireless communication signal data includes the signal strength (e.g., RSSI), of each of the wireless communication signals at multiple locations while the vehicle operator is moving away from the vehicle 10 after the vehicle 10 has been parked at the parking location. These multiple locations are spaced apart from one another by a predetermined distance (e.g., ten meters). Alternatively, or additionally, the remote server 200 may collect the wireless communication signal data from one or more remote vehicles that approach the parking location from different directions while the vehicle operator is moving away from the vehicle 10 after the vehicle 10 has been parked at the parking location. This wireless communication signal data is uploaded to the vehicle 10 and the remote server 200. Then, the method 300 continues to block 312.

At block 312, the device controller 134 determines if the vehicle operator is constantly moving toward the vehicle 10 by detecting and monitoring the location of the mobile device 100. Further, the device controller 134 determines the distance from the vehicle operator to the vehicle 10 while the vehicle operator is constantly moving toward the vehicle to determine whether the distance from the vehicle operator to the vehicle 10 is less than a predetermined approaching threshold (e.g., ten meters). If the distance from the vehicle operator to the vehicle 10 while the vehicle operator is constantly moving toward the vehicle 10 to determine whether the distance from the vehicle operator to the vehicle 10 is less than a predetermined approaching threshold, then the digital key application is triggered. Then, the method 300 proceeds to block 314.

At block 314, the mobile device 100 uses the digital key application to estimate the user profile patterns (i.e., the patterns of the vehicle operator) during every interaction of the digital key for each wireless communication technology while the vehicle operator is moving away from and/or toward the vehicle 10. The user profile pattern estimates include the wireless communication signal data (e.g., signal strength) for each wireless communication technology every time the vehicle operator moves (while holding the mobile device 100) away from or toward the vehicle 10 toward a known frequent location. The user profile pattern is estimated for each approach toward the vehicle 10 or movements away from the vehicle 10 based on known historic location (e.g., movement between a frequent parking location and a frequent venue by the vehicle operator). The user profile estimates are divided based on the direction of the movement by the vehicle operator (e.g., movement toward the vehicle 10 and movement away from the vehicle 10). Then, every wireless communication technology (i.e., wireless communication network) is ranked in a priority ranking matrix for each movement direction by the vehicle operator. Then, the priority ranking matrix serves as an input of a machine learning model (e.g., a deep neural network) and the method 300 continues to block 316.

At block 316, the vehicle controller 34 uses a machine learning model, such as a deep neural network, to rank the wireless communication technologies for wirelessly connecting the mobile device 100 to the vehicle 10 and operating the digital key. The machine learning model may perform vectorization of different dynamic factors for location segment. As stated above, the wireless communication signal data is collected at multiple locations spaced apart from one another (i.e., location segments). These dynamic factors may include traffic, location, time of the day, seasonality, range of the wireless communication technology, a number of users, etc. These different dynamic factors may be obtained from the user profile pattern and the previously collected wireless communication signal data. The machine learning model (e.g., deep neural network) then ranks the available wireless communication technologies or networks (e.g., Bluetooth, Wi-Fi, cellular, UWB, etc.) using, for example, a priority ranking matrix. As non-limiting examples, the inputs of the machine learning models include wireless communication signal data, dynamic external factors vector representation, best network vector sampling, smart situational awareness data, and a tolerance window. The tolerance window is the average information from the moving window described above. The output of the machine learning model is a priority rank matrix including a confidence score and a rank for each wireless communication technology (i.e., wireless communication networks such NFC, UWB, Bluetooth, Bluetooth low energy, and Wi-Fi, and a cellular networks. The priority rank matrix and the digital key may be shared from the mobile device 100 of the vehicle operator (i.e., vehicle owner) to the mobile devices of family, friends, or any other entity. Some other mobile devices may be part of a dynamic whitelist and these other mobile devices 100 may provide dynamic feedback of the tech matrix just like it would to the mobile device 100 of the vehicle owner would. device. Then, the method 400 then proceeds to block 318.

At block 318, the digital key application then selects and searches for the wireless communication technology (i.e., wireless communication networks) with the highest rank. Further, the information about the selected wireless communication technology is uploaded the remote server 200 and is communicated to other vehicles. Then, the method 300 continues to block 320.

At block 320, the digital key application commands the vehicle 10 to search for the wireless communication technology (i.e., wireless communication networks) with the highest rank through the remote server 200. Next, a wireless communication between the mobile device 100 and the vehicle 10 is established using the selected wireless communication technology (i.e., network), thereby allowing the digital key application to operate as a digital key for the vehicle 10. Then, the vehicle operator may operate the digital key of the digital key application to actuate one or more actuators 26 (e.g., door) of the vehicle 10. For instance, the digital key may be operated to unlock a door of the vehicle 10 after establishing the wireless communication between the mobile device 100 and the vehicle 10 using the selected wireless communication technology (i.e., wireless communication network).

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for operating a digital key configured to wirelessly connect to a vehicle, comprising:

receiving wireless communication signal data, wherein the wireless communication signal data includes information about a plurality of wireless communication signals within a predetermined distance from the vehicle, and the wireless communication signal data includes a received signal strength indicator (RSSI) and Channel State Information (CSI) and Channel Quality Information (CQI) of each of the plurality of wireless communication signals within the predetermined distance from the vehicle forming a network pattern;

receiving vehicle data, wherein the vehicle data includes information about the vehicle, and the vehicle data includes a parking location of the vehicle;

triggering a digital key system of a vehicle to establish wireless connection with a digital key of a mobile device in response to matching the network pattern and determining that a distance between the mobile device is less than a predetermined distance threshold;

ranking, using a machine learning model, a plurality of wireless communication technologies for wirelessly connecting the mobile device to the vehicle, wherein the vehicle data and the wireless communication signal data are inputs of the machine learning model;

selecting one of the plurality of wireless communication technologies based on ranking of the plurality of wireless communication technologies as determined by the machine learning model;

establishing a wireless communication between the mobile device and the vehicle using the selected one of the plurality of wireless communication technologies, wherein a digital key application is running on the mobile device, thereby allowing the digital key application to operate as the digital key for the vehicle after the wireless communication between the mobile device and the vehicle is established receiving navigational data, wherein the navigational data includes a location of the vehicle while the vehicle is moving toward the parking location;

determining a distance from the location of the vehicle to the parking location using the navigational data;

comparing the distance from the location of the vehicle to the parking location with the predetermined distance threshold to determine whether the distance from the location of the vehicle to the parking location is less than the predetermined distance threshold; and collecting the wireless communication signal data in response to determining that the distance from the location of the vehicle to the parking location is less than the predetermined distance threshold, wherein the wireless communication signal data includes the RSSI and Channel State Information (CSI) and Channel Quality Information (CQI) of each of the plurality of wireless communication signals at multiple locations while the vehicle is moving toward the parking location, and the multiple locations are spaced apart from one another by a predetermined distance; and collecting parking infrastructure data solely in response to determining that the distance from the location of the vehicle to the parking location is less than the predetermined distance threshold, wherein the parking infrastructure data is information about a parking infrastructure in the parking location.

2. The method of claim 1, further comprising:

uploading the wireless communication signal data to the digital key application running on the mobile device; and uploading the wireless communication signal data to a remote server.

3. The method of claim 2, further comprising:

determining that the vehicle has parked at the parking location;

in response to determining that the vehicle has parked at the parking location, collecting the wireless communication signal data, using the mobile device, while a vehicle operator is moving away from the vehicle after the vehicle has parked at the parking location, wherein the wireless communication signal data includes the RSSI and Channel State Information (CSI) and Channel Quality Information (CQI) of each of the plurality of wireless communication signals at multiple locations while the vehicle operator is moving away from the vehicle after the vehicle has been parked at the parking location, and the multiple locations are spaced apart from one another by a predetermined distance;

uploading the wireless communication signal data to the vehicle; and uploading the wireless communication signal data to the remote server.

4. The method of claim 2, further comprising:

determining that the vehicle has parked at the parking location;

in response to determining that the vehicle has parked at the parking location, collecting the wireless communication signal data from a plurality of remote vehicles while a vehicle operator is moving away from the vehicle after the vehicle has parked at the parking location, wherein the wireless communication signal data includes the RSSI and Channel State Information (CSI) and Channel Quality Information (CQI) of each of the plurality of wireless communication signals at multiple locations while the vehicle operator is moving away from the vehicle after the vehicle has been parked at the parking location, and the multiple locations are spaced apart from one another by a predetermined distance;

uploading the wireless communication signal data to the vehicle; and uploading the wireless communication signal data to the remote server.

5. The method of claim 2, further comprising:

determining that a vehicle operator is constantly moving toward the vehicle;

determining a distance from the vehicle operator to the vehicle while the vehicle operator is constantly moving toward the vehicle to determine whether the distance from the vehicle operator to the vehicle is less than a predetermined approaching threshold; and in response to determining that the distance from the vehicle operator to the vehicle while the vehicle operator is constantly moving toward the vehicle is less than the predetermined approaching threshold, ranking, using the machine learning model, the plurality of wireless communication technologies for wirelessly connecting the mobile device to the vehicle.

6. The method of claim 5, further comprising determining a user profile pattern of the vehicle operator while the vehicle operator is moving relative to the vehicle, wherein the user profile pattern serves as one of the inputs of the machine learning model.

7. The method of claim 1, wherein the plurality of wireless communication technologies includes near-field communication (NFC), Ultra-wideband (UWB), Bluetooth, and Wi-Fi, and a cellular network.

8. The method of claim 1, further comprising operating the digital key to conduct vehicle operations after establishing the wireless communication between the mobile device and the vehicle using the selected one of the plurality of wireless communication technologies.

9. The method of claim 1, wherein the selected one of the plurality of wireless communication technologies has a highest rank.

10. A vehicle, comprising:

a body;

a plurality of vehicle transceivers coupled to the body;

a plurality of sensors coupled to the body;

a vehicle controller in communication with the plurality of sensors and the plurality of vehicle transceivers, wherein the vehicle controller is programmed to:

receive wireless communication signal data, wherein the wireless communication signal data includes information about a plurality of wireless communication signals within a predetermined distance from the vehicle, and the wireless communication signal data includes a received signal strength indicator (RSSI) and Channel State Information (CSI) and Channel Quality Information (CQI) of each of the plurality of wireless communication signals within the predetermined distance from the vehicle;

receive vehicle data, wherein the vehicle data includes information about the vehicle, and the vehicle data includes a parking location of the vehicle;

rank, using a machine learning model, a plurality of wireless communication technologies for wirelessly connecting a mobile device to the vehicle, wherein the vehicle data and the wireless communication signal data are inputs of the machine learning model;

select one of the plurality of wireless communication technologies based on ranking of the plurality of wireless communication technologies as determined by the machine learning model;

establish a wireless communication between the mobile device and the vehicle using the selected one of the plurality of wireless communication technologies, wherein a digital key application is running on the mobile device, thereby allowing the digital key application to operate as a digital key for the vehicle after the wireless communication between the mobile device and the vehicle is established receive navigational data, wherein the navigational data includes a location of the vehicle while the vehicle is moving toward the parking location;

determine a distance from the location of the vehicle to the parking location using the navigational data;

compare the distance from the location of the vehicle to the parking location with a predetermined distance threshold to determine whether the distance from the location of the vehicle to the parking location is less than the predetermined distance threshold; and collect the wireless communication signal data in response to determining that the distance from the location of the vehicle to the parking location is less than the predetermined distance threshold, wherein the wireless communication signal data includes the RSSI and Channel State Information (CSI) and Channel Quality Information (CQI) of each of the plurality of wireless communication signals at multiple locations while the vehicle is moving toward the parking location, and the multiple locations are spaced apart from one another by a predetermined distance; and collect parking infrastructure data solely in response to determining that the distance from the location of the vehicle to the parking location is less than the predetermined distance threshold, wherein the parking infrastructure data is information about a parking infrastructure in the parking location.

11. The vehicle of claim 10, wherein the controller is further programmed to:

upload the wireless communication signal data to the digital key application running on the mobile device; and upload the wireless communication signal data to a remote server.

12. The vehicle of claim 11, wherein the controller is further programmed to:

determine that the vehicle has parked at the parking location;

in response to determining that the vehicle has parked at the parking location, collect the wireless communication signal data, using the mobile device, while a vehicle operator is moving away from the vehicle after the vehicle has parked at the parking location, wherein the wireless communication signal data includes the RSSI and Channel State Information (CSI) and Channel Quality Information (CQI) of each of the plurality of wireless communication signals at multiple locations while the vehicle operator is moving away from the vehicle after the vehicle has been parked at the parking location, and the multiple locations are spaced apart from one another by a predetermined distance;

upload the wireless communication signal data to the vehicle; and upload the wireless communication signal data to the remote server.

13. The vehicle of claim 11, further comprising:

determine that the vehicle has parked at the parking location;

in response to determining that the vehicle has parked at the parking location, collect the wireless communication signal data from a plurality of remote vehicles while a vehicle operator is moving away from the vehicle after the vehicle has parked at the parking location, wherein the wireless communication signal data includes the RSSI of each of the plurality of wireless communication signals at multiple locations while the vehicle operator is moving away from the vehicle after the vehicle has been parked at the parking location, and the multiple locations are spaced apart from one another by a predetermined distance;

upload the wireless communication signal data to the vehicle; and upload the wireless communication signal data to the remote server.

14. The vehicle of claim 11, wherein the controller is further programmed to:

determine that a vehicle operator is constantly moving toward the vehicle;

determine a distance from the vehicle operator to the vehicle while the vehicle operator is constantly moving toward the vehicle to determine whether the distance from the vehicle operator to the vehicle is less than a predetermined approaching threshold; and in response to determining that the distance from the vehicle operator to the vehicle while the vehicle operator is constantly moving toward the vehicle is less than the predetermined approaching threshold, rank, using the machine learning model, the plurality of wireless communication technologies for wirelessly connecting the mobile device to the vehicle.

15. The vehicle of claim 14, wherein the controller is further programmed to determine a user profile pattern of the vehicle operator while the vehicle operator is moving relative to the vehicle, wherein the user profile pattern serves as one of the inputs of the machine learning model.

16. The vehicle of claim 10, wherein the plurality of wireless communication technologies includes near-field communication (NFC), Ultra-wideband (UWB), Bluetooth, and Wi-Fi, and a cellular network.

17. The vehicle of claim 10, wherein the controller is further programmed to operate the digital key to conduct vehicle operations after establishing the wireless communication between the mobile device and the vehicle using the selected one of the plurality of wireless communication technologies.

18. The vehicle of claim 10, wherein the selected one of the plurality of wireless communication technologies has a highest rank.

* * * * *